United States Patent [19]
Edds et al.

[11] 3,870,528
[45] Mar. 11, 1975

[54] INFRARED AND VISIBLE DUAL DYE JET PRINTER INK

[75] Inventors: Kenneth E. Edds, Versailles; Donald L. Elbert, Lexington; Jerry F. Stone, Georgetown, all of Ky.

[73] Assignee: International Business Machines Corporation, Armonk, N.Y.

[22] Filed: Dec. 17, 1973

[21] Appl. No.: 425,346

[52] U.S. Cl. .................................... 106/22, 106/31
[51] Int. Cl. ...................... C09d 11/02, C09d 11/12
[58] Field of Search ............................... 106/20–22

[56] References Cited
UNITED STATES PATENTS
3,705,043   12/1972   Zabiak ................................ 106/20

*Primary Examiner*—Theodore Morris
*Attorney, Agent, or Firm*—Laurence R. Letson

[57] ABSTRACT

This document discloses compositions for an ink for use in a jet printing apparatus wherein a stream of ink is forced through a small nozzle to form a series of substantially uniformly sized and spaced drops which are then sequentially charged and then deflected electrostatically for positioning the drop placement onto a record sheet.

4 Claims, No Drawings

INFRARED AND VISIBLE DUAL DYE JET PRINTER INK

Background of the Invention

Ink formulations for jet printing ink require many different characteristics and it has been exceedingly difficult to attain all the characteristics in a single ink. Prior inks have displayed, either utility in the visible range or utility in the infrared absorptive range or, at best, a compromise between the desired qualities of both a visible printing ink and an infrared absorptive ink. Infrared absorption is essential for use in a scanning mechanism such as an optical character recognition scanner or other bar code type of scanners.

With the requirement that many, many pieces of documentation be not only printed but be handled and sorted mechanically according to some coding or content, it is becoming increasingly necessary that an ink be suitable for both purposes.

Prior art inks for near infrared absorption have to a large extent been a source of considerable problems in ink jet printing inasmuch as the nozzle orifice in an ink jet printer is on the order of 1 to 2 mils in diameter and any substantial agglomeration or contamination of the ink renders the entire printer inoperative until such time as the system is restored to a clean condition. Any material present in a particulate form is generally undesirable, such as pigments which are not soluble in the primary liquid vehicle, even though the pigment, carbon black, possesses the required degree of near IR absorption. The undesirability of such non-soluble components results from the fact that the particles of non-soluble material have a tendency to agglomerate through attractive forces and thus form agglomerations which quickly become too large to pass through either the filters in the system or the nozzle of the jet apparatus. Further, pigments are undesirable since they settle causing non-uniform ink compositions.

Inks containing water soluble dyes, although the materials are soluble, also exhibit, to some extent, instability in that the minute dye particles or dye molecules will tend to agglomerate and thus form larger particles. Prior art inks using nigrosine dye have been prone to this agglomeration problem.

Another requirement of an ink is an archival property, i.e., resistance to water. Prior art inks of the infrared absorbing type are not permanent due to poor resistance to water and the images wash off or blur since the dyes known to absorb in the near infrared region do not dye the fibers of the paper. These inks have required some sort of fixing agent which will cause the ink to be permanent. These fixing agents in turn cause the ink spots on the paper to become large and non-uniform which reduces the overall level of print quality.

By careful selection and combination of the materials which may be included in an ink formulation, a satisfactory solution to most if not all of these problems may be arrived at.

It is an object of this invention to improve the absorbtivity of an ink both in the visible region for human reading as well as in the near infrared region for a mechanical/optical reading.

It is another object of this invention to stabilize an ink formulation so that the life of the ink surpasses that normally required for system operation, and normal storage.

It is a further object of this invention to stabilize a dye within the ink formulation where the dye is normally unstable, by the use of a second dissimilar dye.

It is still another object of this invention to provide an infrared absorptive and visible ink which is permanent to water after printing on paper and still retains an acceptable level of print quality.

The foregoing and other objects, features and advantages of the invention will be apparent from the following more particular description of preferred embodiments of the invention.

SUMMARY OF THE INVENTION

The combining of water with water soluble nigrosine dye provides a water solution of high tinctural value which continually flocculates. These flocculates agglomerate at a continuous rate. The agglomerations of dye molecules and dye particles soon become so prevalent throughout the dye formula that filters are clogged by the dye particles and thus prevent operation of the jet printer.

By combining two dyes, one an infrared absorptive dye and the other a dye which is very strongly absorptive in the visible ranges but not in the infrared radiation range of 700 to 1100 millimicrons or 7000 to 11000 Angstrom units, a stabilizing effect occurs, if the molecular structure of the two dyes are greatly dissimilar.

Further enhancement of the stabilization and preventing of the agglomeration can also be accomplished through the addition of Butyl Carbitol which is diethylene glycol monobutyl ether.

Permanence on paper is obtained through the use of Direct Black 4 or Direct Black 38 dyes.

DETAILED DESCRIPTION OF INVENTION

It has been found that the use of water soluble nigrosine dyes when used by themselves continually form agglomerations and therefore precipitate large quantities of the dye particles out of solution. This causes a twofold problem in that it alters the composition of the ink jet ink formulation and at the same time presents within the system agglomerations and particulate matter in excess of that allowable for continued long term operation of the jet printer, due to the size of the filter holes and the size of the ink jet orifice.

Water soluble nigrosine dye known as Acid Black 2, a dye which is widely used in printing and other environments involving paper and which exhibits a high infrared absorption characteristic, is desirable because of its relatively low cost use and availability and its infrared absorbing characteristics. It is necessary to either use a material to maintain the nigrosine in suspension or to expect an extremely short shelf life or usable period due to the agglomeration of the water soluble nigrosine molecules.

An ink solution of preferred characteristics and composition is made by combining several selected materials. The water soluble nigrosine is combined with a small amount of polyethylene glycol, such as the material marketed under the name of Carbowax 1500 which is a blend of Carbowax 300 and Carbowax 1540 and has an average molecular weight of approximately 600. Carbowax 1500 acts an an anti-crusting agent, i.e., it prevents the nigrosine from forming a crystalline film over the nozzle tip as water evaporates during shutdown. If such a film or crust is formed, the stream will not start-up upon demand.

Butyl Carbitol is added, which serves as an agent to enhance the stabilization of the dye components in water.

With a relatively large amount of distilled water as the liquid vehicle, the above mixture then has added to it a Direct Black 4 dye and an N-methyl 2 pyrrolidone (NM2P) mixture where the NM2P acts as a solubilizing agent for the direct black 4.

The specific procedure and quantities are enumerated below.

A water soluble nigrosine (acid black 2) ink is formulated from the following components:

| MATERIALS | PARTS BY WEIGHT |
|---|---|
| Nigrosine WSB | 2.0 |
| Carbowax 1500 (Union Carbide) (Polyethylene glycol, a blend with an avg. molecular weight of 600) | 2.0 |
| Diethylene glycol mono-butyl ether (Butyl Carbitol) | 0.5 |
| Distilled Water (Incl. 0.1% concentration of Sodium omadine) | 88.5 |

The 0.1 percent concentration of Sodium Omadine acts in a beneficial way as a fungicide or anti-bacterial agent. The Sodium Omadine is sodium-2-pyridinethiol 1-oxide marketed by OLIN Chemicals.

The above mixture is thoroughly stirred until the components are dissolved and thoroughly mixed.

Four parts Phenamine black RW concentrated dye is introduced into the above composition and stirred until solubilized.

Three parts N-methyl-2-pyrrolidone (NM2P) is then added while stirring the above mixture to yield a preferred formulation for a visible and infrared absorptive ink as described below.

| MATERIALS | PARTS BY WEIGHT |
|---|---|
| Nigrosine WSB (acid black 2) | 2.0% |
| Carbowax 1500 | 2.0% |
| Butyl Carbitol | 0.5% |
| Distilled Water (incl. 0.1% concentration of Sodium Omadene) | 88.5% |
| Phenamine Black RW concentrate (CI 30245 or Direct Black 4) | 4.0% |
| N-methyl 2 pyrrolidone | 3.0% |

An interaction which is believed to occur between the different materials causes a stabilizing effect by the addition of the Phenamine black RW concentrate to an ink containing nigrosine dye which is generally unstable. Butyl Carbitol in small quantities adds a stabilizing effect to the nigrosine water soluble black as well as the Phenamine black RW. The N-methyl-2-pyrrolidone acts as an agent to enhance the solubilization of the Phenamine black RW.

The Nigrosine dye is not a single clearly identifiable compound but is identified in The Chemistry of Synthetic Dyes and Pigments at page 243 as being a mixture of the following structures:

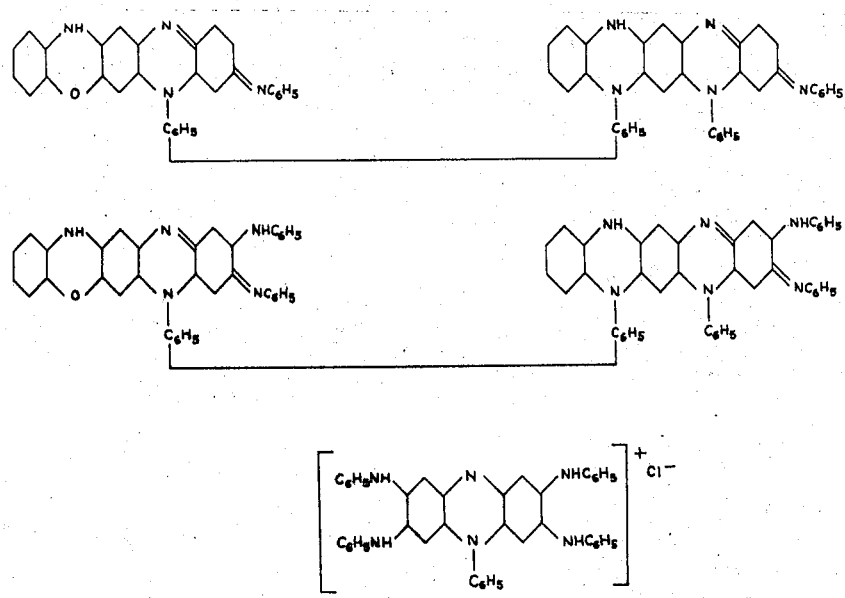

The compounds shown are the oil soluble derivatives. The nigrosines are rendered water soluble by the addition of sulfonic acid groups [— $SO_3H$] which form the sodium salt [— $SO_3N_a$] in basic solutions. Induline 6B is believed to be a side produce of the nigrosine fusion.

The Direct Black 4 [CI 30245] dye is believed to have a chemical structure as shown below:

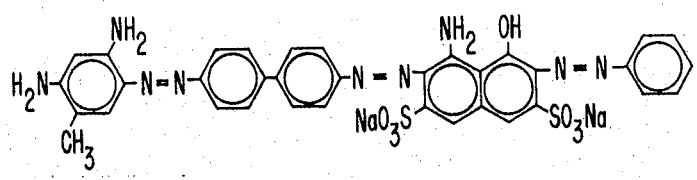

The Direct Black 38 [CI 30235] dye is believed to have a chemical structure as shown below:

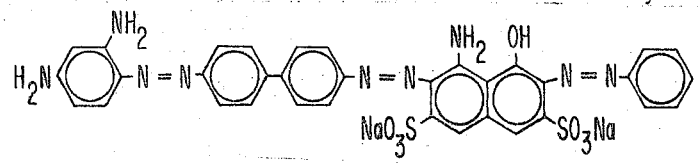

Additional ink formulations which have shown acceptability as jet printing inks and which exhibit the characteristics of the preferred formulation, include the following three formulations all compounded using the same procedure as that described for the formula immediately above.

FORMULA 2

| | |
|---|---|
| Phenamine Black RW concentrate | 3% |
| Nigrosine WSB | 3% |
| Carbowax 1500 | 2% |
| N-methyl-2-pyrrolidone | 3% |
| Butyl Carbitol | 0.5% |
| Propylene glycol | 7.0% |
| Distilled Water (containing .1% concentration of sodium propionate) | 81.5% |

Sodium propionate is a fungicide or bactericide which prevents fungicidal growth in the ink which colonize and clog filters and nozzles.

FORMULA 3

| | |
|---|---|
| Phenamine Black RW concentrate Direct Black 4 | 4% |
| Nigrosine WSB (acid black 2) | 2% |
| Carbowax 1500 | 2% |
| N-methyl-2-pyrrolidone | 3% |
| Butyl Carbitol | 0.5% |
| Distillled Water | 88.5% |

FORMULA 4

| | |
|---|---|
| Phenamine Black E200 (Direct Black 38) | 3% |
| Nigrosine WSB | 2% |
| Butyl Carbitol | .5% |
| Carbitol Solvent (Diethylene glycol monoethyl ether) | 4.0% |
| Polyethylene Glycol 200 | 3.0% |
| Distilled Water (containing 0.1% Sodium Omadine) | 87.5% |

The propylene glycol and polyethylene glycol and the Carbowax 1500 all act as agents to prevent drying and crusting at the nozzle during shutdown. Judicious selection of quantity and material in this class can provide the beneficial effects of a non-crusting agent while at the same time not adversely affecting the viscosity of the ink.

The 0.1 percent concentration of Sodium Omadine acts in a beneficial way as a fungicide or anti-bacterial agent. The Sodium Omadine is sodium-2-pyridinethiol 1-oxide marketed by OLIN Chemicals.

By way of negative examples, formulas 5 and 6 are enumerated below.

| COMPONENT | FORMULA 5 | FORMULA 6 |
|---|---|---|
| Phenamine Black RW concentrate | 1.5 | 3.3 |
| Nigrosine WSB | 1.5 | 3.3 |
| Carbowax 200 | 10.0 | 0 |
| Triton X-100 | 0.1 | 0.3 |
| N-methyl-2-pyrrolidone | 4.0 | 2.0 |
| Distilled Water | 82.9 | 88.1 |
| Carbowax 1500 | 0 | 3.0 |

The above two formulations although containing two dyes which appear to have some stabilizing effect for at least the near or short term, do not exhibit the synergistic interaction and long term stability of other dual dye systems not containing Butyl Carbitol. The Triton X-100 is a surfactant and is believed to be alkylaryl polyether alcohol. It has a similar effect or is believed to have a similar effect to the N-methyl-2-pyrrolidone.

The stability of an ink formulation may be measured by passing the ink under a five pound per square inch pressure drop through a 25 millimeter diameter, 5 micron opening filter pores such as, for example, a Teflon filter marketed under the name of Mitex Millipore filter.

An indication of the stability of the dye with respect to non agglomeration of dye particles is the flow rate in grams per minute and a total flow quantity for a 10 minute test flow. To be acceptable, the flow must be sustained at an acceptable rate during the entire test and be repeatable during the expected shelf life of the ink. The flow rate must exceed that which is required for normal printer demands and that is generally in the order of approximately 0.5–5 grams per minute for most jet printers, for a single jet. Further the flow rate must not be sharply reduced during the test as this indicates the clogging of the filter with agglomerates. A slow decrease in flow rate with time indicates stability while a sharp decrease indicates instability.

The stability of these dual dye inks is superior to that of a single nigrosine dye ink system but is considerably lower than the preferred formula enumerated above as Formula 1.

Comparisons of preferred formula 3 together with the Formulas 5 and 6, by way of negative example, with respect to stability, as measured by flow rate is enumerated in the flow rate table immediately below.

FLOW RATE TABLE

| INK | FLOW RATE AT END OF 10 MINUTES | AGE OF INK | TOTAL FLOW FOR 10 Min. |
|---|---|---|---|
| Formula 3 | 12.0 grams/min. | 60 days | 213.0 grams |
| Formula 5 | 0.2 grams/min. | 18 days | 25.1 grams |
| Formula 6 | 0.8 grams/min. | 18 days | 48.3 grams |

A similar comparison using the preferred formulation with and without the anti-microbial or anti-bacterial agent and fungicide further indicates that in addition to flocculation of dye particles in the formation of agglomerates which plug and clog nozzles and filters, micorbial growth is of a very critical consideration.

| INK | FLOW RATE AT END OF 10 MINUTES | AGE OF Ink | TOTAL FLOW FOR 10 MIN. |
|---|---|---|---|
| Formula 1 | 56.0 grams/min. | 60 days | 620.0 grams |
| Formula 3 | 12.0 grams/min. | 60 days | 213.0 grams |

The employing of a combination of Butyl Carbitol and the dual dye system described above provides an ink which has a high degree of stability and has a high degree of permanence for both dyes. There is some smearing and bleed but about 90 percent of the IR absorption for a printed area is retained as well as permanence of the visible dye. It is believed that the IR permanence is due to the dual dye system.

SUMMARY

From the foregoing, it appears that there is a substantial effect between the use of a direct black dye to partially enhance the stabilization of the nigrosine water soluble dye and at the same time the use of a Butyl Carbitol in small quantities to enhance the stability of the dual dye system even further. By eliminating or substantially controlling the growth of undesirable fungus and microbes in the ink which agglomerate into colonies and cause subsequent clogging, the stability of the inks can be increased to the point where the flow under the described pressure and filtering conditions is such that the ink jet printer will be supplied with an adequate quantity of ink and thereby be capable of continued long term operation.

It should be clear that Formulas 5 and 6 do not represent what are presently considered operative formulations inasmuch as their stability is extremely short lived and their flow rate is such that it will not adequately supply the nozzle of an ink jet printer during operation.

The dual dye system is partially stable but for long life, a dual dye system must be supplemented with a stabilizing agent.

The use of the Direct Black dyes has the effect of making permanent both the visual dying and the nigrosine infrared absorbing dye. This effect is believed to be due to the binding of the nigrosine molecules to the paper fibers by the Direct Black dye molecules, but is not fully understood. Regardless of the mechanism which operates, the nigrosine dyes are made to possess archival properties permanent to water contact and will not wash off or otherwise be adversely affected by water contact, so long as the paper retains its integrity.

Use of Direct Black 4 to make print of nigrosine permanent with respect to water has the added property of not degrading print quality as compared with other means of fixing nigrosine on the paper.

While the invention has been particulary shown and described with reference to preferred embodiments thereof, it will be understood by those skilled in the art that the foregoing and other changes in form and details may be made therein without departing from the spirit and scope of the invention.

We claim:

1. An optical character reader readable and visually readable ink jet ink formulation comprising:

an infrared absorbing dye which exhibits high absorptivity for radiation with a wavelength of about 9000 A, present in the ink formulation in about 1 to 5 percent;

a dye which highly absorbs in the visible spectrum and which permanently dyes the fibers of a cellulosic substrate present in about 2 to 5 percent concentration and where said dye is selected from group consisting of dyes having color index numbers of 30235 and 30245;

a polyethylene glycol of an average molecular weight of from about 500 to 600, present in the ink in about 1 to 3.5 percent:

a dye solvent for at least one of said dyes, present in the ink in the amount of about 2.0 to 4.5 percent wherein said solvent is selected from the group consisting of N-methyl-2-pyrrolidone and diethylene glycol monoethyl ether;

diethylene glycol monobutyl ether present in the ink in the amount of about 0.25 to 0.75 percent;

and the balance water, all percentages being percentages by weight with respect to the weight of the entire ink formulation.

2. claim 1 wherein said infrared absorbing dyes is water soluble Nigrosine.

3. claim 2 wherein said water contains an effective concentration of an anti-microbial agent selected from the group consisting of sodium-2-pyridinethiol-1-oxide and sodium propionate.

4. A jet printer ink comprising:

about 1.5 to 2.5 parts of a first water solublized dye absorptive in about the 9000 A wave length region, said dye consisting essentially of water soluble nigrosine;

about 3.5 to 4.5 parts of a second, water solublized permanent dye strongly absorptive in the visible region, said dye being a dye with a color index number 30245;

about 1.5 to 2.5 parts of polyethylene glycol with an average molecular weight of about 500 to 600;

about 0.25 to 0.75 parts of diethylene glycol monobutyl ether;

about 2.5 to 3.5 parts of N-methyl-2-pyrrolidone and about 86.25 to 90.75 parts water having therein an effective amount of Sodium-2-pyridinethiol-1-oxide to prevent growth of undesirable microbes and fungus, all parts being by weight, whereby said first and second dyes are stabilized and maintained in solution for a period of time sufficient to permit use for printing indicia observable by the human eye and by infrared detection apparatus.

* * * * *